United States Patent
Lukic et al.

(10) Patent No.: US 9,384,172 B2
(45) Date of Patent: Jul. 5, 2016

(54) MULTI-LEVEL LIST DETECTION ENGINE

(75) Inventors: Dusan Lukic, New Belgrade (RS);
Victor Jitlin, Tel Aviv (IL); Milos Raskovic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/808,052

(22) PCT Filed: Jul. 6, 2012

(86) PCT No.: PCT/EP2012/002866
§ 371 (c)(1),
(2), (4) Date: Sep. 10, 2013

(87) PCT Pub. No.: WO2014/005610
PCT Pub. Date: Jan. 9, 2014

(65) Prior Publication Data
US 2015/0149893 A1    May 28, 2015

(51) Int. Cl.
*G06F 17/00* (2006.01)
*G06F 17/21* (2006.01)
*G06F 17/22* (2006.01)
*G06F 17/27* (2006.01)
*G06F 17/24* (2006.01)

(52) U.S. Cl.
CPC .......... *G06F 17/211* (2013.01); *G06F 17/2264* (2013.01); *G06F 17/24* (2013.01); *G06F 17/2705* (2013.01); *G06F 17/2745* (2013.01)

(58) Field of Classification Search
CPC .................................................. G06F 17/2264
See application file for complete search history.

(56) References Cited

U.S. PATENT DOCUMENTS 5,280,609 A * 1/1994 MacPhail
5,408,665 A * 4/1995 Fitzgerald ..................... 717/163

(Continued)

FOREIGN PATENT DOCUMENTS

EP    1107169 A2    6/2001
WO    WO03098370 A2    11/2003

OTHER PUBLICATIONS

XtremePDFConverter VCL v3.0.1, Published Date: Jan. 4, 2010, http://www.gnostice.com/XtremePDFConverter_VCL.asp, 2 pages.

(Continued)

*Primary Examiner* — Laurie Ries
(74) *Attorney, Agent, or Firm* — Jessica Meyers; Tong Wong; Micky Minhas

(57) ABSTRACT

A multi-level list detection engine. The multi-level list detection engine detects text obtained from a fixed format document that is formatted as a static multi-level list and creates a dynamic multi-level list object in a flow format document. The resulting dynamic multi-level list object automatically updates as the end user edits the multi-level list in the flow format document. The multi-level list detection engine identifies list elements in the fixed format text based on the presence of a list identifier. The list elements are grouped into lists based on the properties of each list element relative to other list elements. List elements are then assigned to a list level based on the relative properties of the list elements within a list. Finally, level list assignments are verified and corrected, the levels are merged, as necessary, and the lists are consistently formatted as appropriate to create a final well-formed dynamic multi-level list object.

20 Claims, 15 Drawing Sheets

(56) References Cited

U.S. PATENT DOCUMENTS

| | | | |
|---|---|---|---|
| 5,517,578 A | | 5/1996 | Altman et al. |
| 5,559,945 A | * | 9/1996 | Beaudet et al. ............... 715/841 |
| 5,572,437 A | * | 11/1996 | Rostoker et al. ............. 716/105 |
| 6,236,988 B1 | * | 5/2001 | Aldred |
| 6,651,146 B1 | * | 11/2003 | Srinivas et al. ............... 711/150 |
| 7,295,708 B2 | | 11/2007 | Chen et al. |
| 7,392,473 B2 | | 6/2008 | Meunier |
| 7,424,673 B2 | | 9/2008 | Broman et al. |
| 7,478,170 B2 | | 1/2009 | Ong et al. |
| 8,381,095 B1 | * | 2/2013 | Fischer ........................ 715/234 |
| 2006/0074962 A1 | * | 4/2006 | Fontoura et al. .............. 707/102 |
| 2007/0185837 A1 | * | 8/2007 | Gurcan et al. .................... 707/3 |
| 2011/0222773 A1 | | 9/2011 | Radakovic et al. |

OTHER PUBLICATIONS

Create a Multilevel List, Published Date: Jun. 12, 2010, http://office.microsoft.com/en-us/word-help/create-a-multilevel-list-HA010065017.aspx, 2 pages.

International Search Report and Written Opinion for PCT/EP2012/002866 mailed Apr. 2, 2013.

\* cited by examiner

Mobile Computing Device

MULTI-LEVEL LIST DETECTION ENGINE

BACKGROUND

Flow format documents and fixed format documents are widely used and have different purposes. Flow format documents organize a document using complex logical formatting objects such as sections, paragraphs, columns, and tables. As a result, flow format documents offer flexibility and easy modification making them suitable for tasks involving documents that are frequently updated or subject to significant editing. In contrast, fixed format documents organize a document using basic physical layout elements such as text runs, paths, and images to preserve the appearance of the original. Fixed format documents offer consistent and precise format layout making them suitable for tasks involving documents that are not frequently or extensively changed or where uniformity is desired. Examples of such tasks include document archival, high-quality reproduction, and source files for commercial publishing and printing. Fixed format documents are often created from flow format source documents. Fixed format documents also include digital reproductions (e.g., scans and photos) of physical (i.e., paper) documents.

In situations where editing of a fixed format document is desired but the flow format source document is not available, the fixed format document must be converted into a flow format document. Conversion involves parsing the fixed format document and transforming the basic physical layout elements from the fixed format document into the more complex logical elements used in a flow format document. Existing document converters faced with complex elements, such as multi-level lists, resort to base techniques designed to preserve visual fidelity of the layout of the fixed format document (e.g., text frames, line spacing, character spacing, and images) at the expense of the flowability of the output document. The result is a limited flow format document that requires the user to perform substantial manual reconstruction to have a truly useful flow format document. It is with respect to these and other considerations that the present invention has been made.

BRIEF SUMMARY

The following Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

The multi-level list detection engine detects text obtained a fixed format document that is formatted as a static multi-level list and creates a dynamic multi-level list object in a flow format document. The resulting dynamic multi-level list object automatically updates as the end user edits the multi-level list in the flow format document. The multi-level list detection method performed by the multi-level list detection engine includes the core list detection operations and the post-processing operations. First, the multi-level list detection engine identifies list elements based on the presence of a list identifier, which is one or more characters used to mark a list element. Most any character or sequence of characters can serve as a list identifier. Next, the multi-level list detection engine groups list elements into lists based on a comparison of one or more selected properties of that list element with selected properties of the elements already in a list. In various embodiments, a list element is added into an existing list if (1) the list element continues the numbering sequence started by previous list element or the first list element or (2) has a list identifier indentation greater than the average value of the list identifier indentations of list elements belonging to the sequence started by the first list element in the list. If a list element does not fit in an existing list, the multi-level list detection engine creates a new list and inserts the list element in that new list. Next, the multi-level list detection engine assigns a preliminary list level to each list element based on a comparison of selected properties of that list element with selected properties of the previous list element in the same list. The multi-level list detection engine repeats the list identifier detection operation, the grouping operation, and the level assignment operation for each paragraph in the document.

After processing each paragraph, the multi-level list detection engine performs post-processing operations on the list elements. The post-processing operations include a level correction and merging operation where the multi-level list detection engine compares selected properties of each list element to those selected properties of other list elements and makes corrections to list level assignments as necessary. The multi-level list detection engine attempts to merge one or more list elements of the same list level (i.e., a list level group) that are separated from another list level group of the same list level by one or more list elements of a different list level into a single list level. The post-processing operations also include a list format standardization operation. Typically, the list format standardization creation operation occurs after the level correction operation. A list format includes the properties of the list such as appearance, indentation, and numbering styles of the list identifiers at various levels. The multi-level list detection engine determines these properties by analyzing the corresponding properties of each list element in a list having the same list level. The list format properties are optionally assembled into a list format definition

BRIEF DESCRIPTION OF THE DRAWINGS

Further features, aspects, and advantages of the invention represented by the embodiments described present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

One or more embodiments of a multi-level list detection engine are described herein and illustrated in the accompanying figures. Other features and advantages will be apparent from reading this detailed description and reviewing the associated figures. This detailed description is exemplary of the general inventive concept and should not be used to limit the general inventive concept or the invention as claimed.

The multi-level list detection engine detects text obtained from a fixed format document that is formatted as a static multi-level list and creates a dynamic multi-level list object in a flow format document. The resulting dynamic multi-level list object automatically updates as the end user edits the multi-level list in the flow format document. The multi-level list detection engine identifies list elements in the fixed format text based on the presence of a list identifier. The list elements are grouped into lists based on the properties of each list element relative to other list elements. List elements are then assigned to a list level based on the relative properties of the list elements within a list. Finally, level list assignments are verified and corrected, as necessary, and the list levels are merged and consistently formatted as appropriate to create a final well-formed dynamic multi-level list object.

Figure 1:
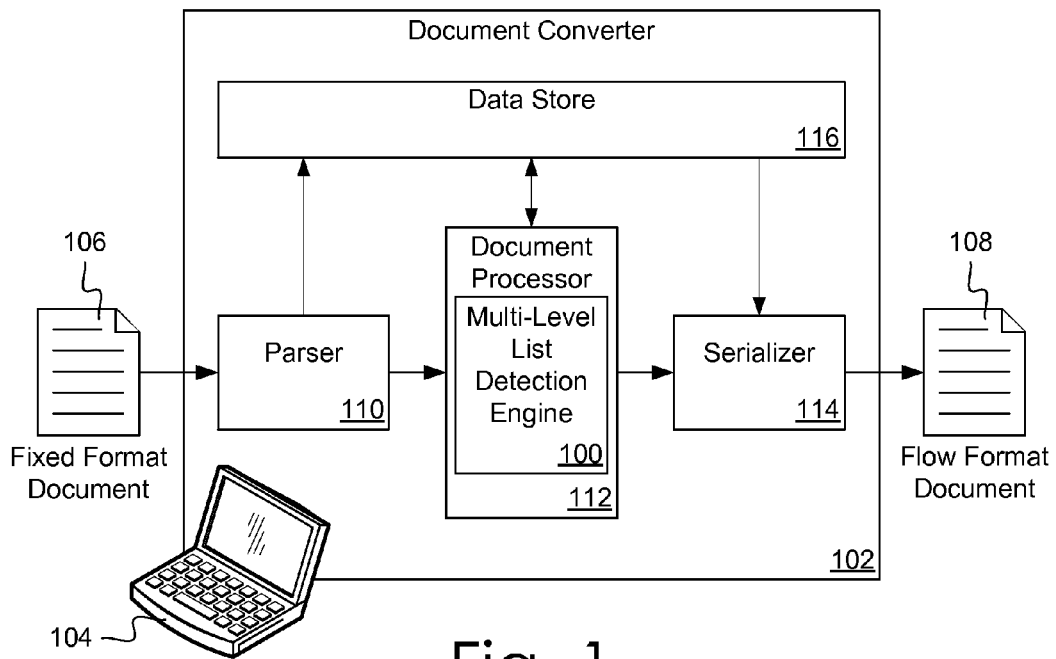
FIG. 1 is a block diagram of one embodiment of a system including the multi-level list detection engine.

FIG. 1 illustrates one embodiment of a system incorporating the multi-level list detection engine 100. In the illustrated embodiment, the multi-level list detection engine 100 operates as part of a document converter 102 executed on a computing device 104. The document converter 102 converts a fixed format document 106 into a flow format document 108 using a parser 110, a document processor 112, and a serializer 114. The parser 110 reads and extracts data from the fixed format document 106. The data extracted from the fixed format document is written to a data store 116 accessible by the document processor 112 and the serializer 114. The document processor 112 analyzes and transforms the data into flowable elements using one or more detection and/or reconstruction engines (e.g., the multi-level list detection engine 100 of the present invention). Finally, the serializer 114 writes the flowable elements into a flowable document format (e.g., a word processing format).

Figure 2:
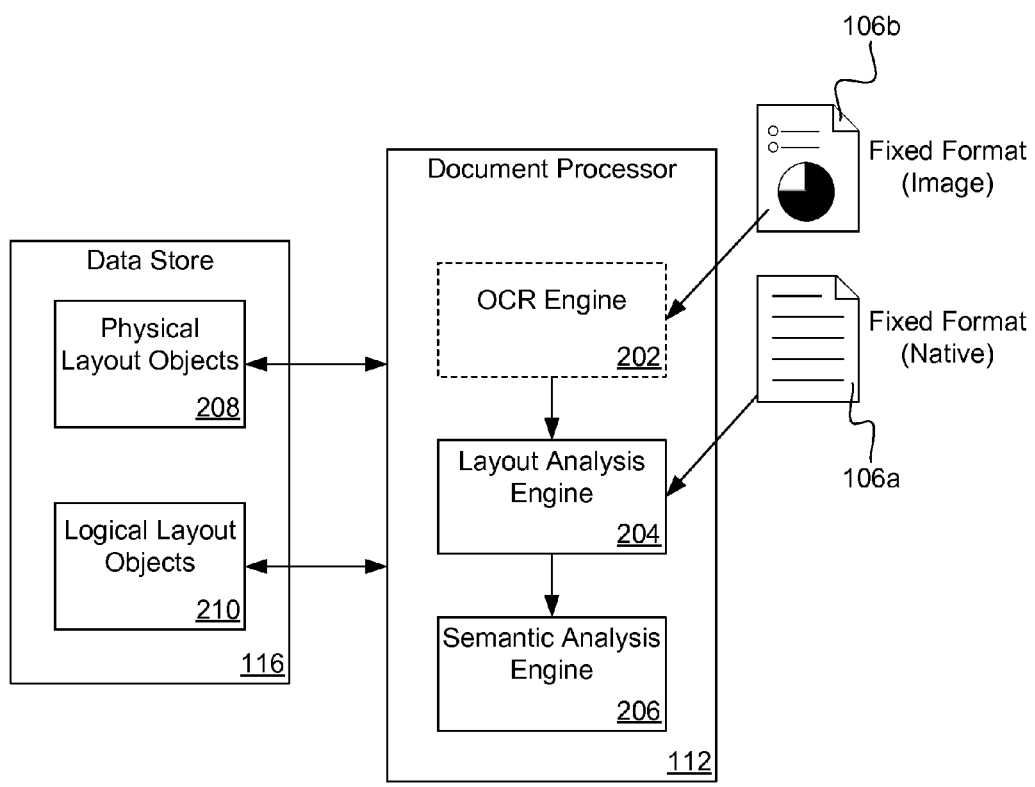
FIG. 2 is a block diagram showing the operational flow of one embodiment of the document processor.

FIG. 2 illustrates one embodiment of the operational flow of the document processor 112 in greater detail. The document processor 112 includes an optional optical character recognition (OCR) engine 202, a layout analysis engine 204, and a semantic analysis engine 206. The data contained in the data store 116 includes physical layout objects 208 and logical layout objects 210. In some embodiments, the physical layout objects 208 and logical layout objects 210 are hierarchically arranged in a tree-like array of groups (i.e., data objects). In various embodiments, a page is the top level group for the physical layout objects 208, while a section is the top level group for the logical layout objects 210. The data extracted from the fixed format document 106 is generally stored as physical layout objects 208 organized by the containing page in the fixed format document 106. The basic physical layout objects include text-runs, images, and paths. Text-runs are the text elements in page content streams specifying the positions where characters are drawn when displaying the fixed format document. Images are the raster images (i.e., pictures) stored in the fixed format document 106. Paths describe elements such as lines, curves (e.g., cubic Bezier curves), and text outlines used to construct vector graphics. Logical data objects include flowable elements such as sections, paragraphs, columns, and tables.

Where processing begins depends on the type of fixed format document 106 being parsed. A native fixed format document 106a created directly from a flow format source document contains the some or all of the basic physical layout elements. Generally, the data extracted from a native fixed format document. The embedded data objects are extracted by the parser and are available for immediate use by the document converter; although, in some instances, minor reformatting or other minor processor is applied to organize or standardize the data. In contrast, all information in an image-based fixed format document 106b created by digitally imaging a physical document (e.g., scanning or photographing) is stored as a series of page images with no additional data (i.e., no text-runs or paths). In this case, the optional optical character recognition engine 202 analyzes each page image and creates corresponding physical layout objects. Once the physical layout objects 208 are available, the layout analysis engine 204 analyzes the layout of the fixed format document. After layout analysis is complete, the semantic analysis engine 206 enriches the logical layout objects with semantic information obtained from analysis of the physical layout objects and/or logical layout objects.

Figure 3:
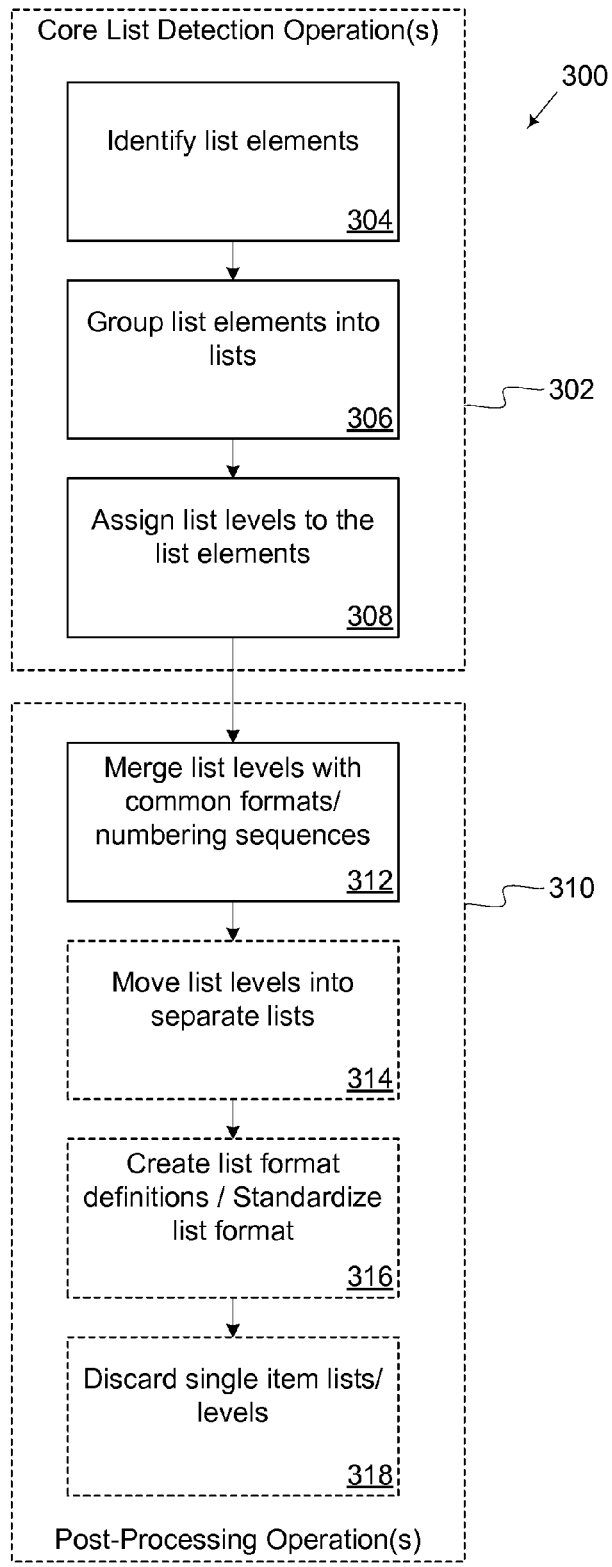
FIG. 3 is a flow chart showing the operation of one embodiment of the multi-level list detection engine.
Figure 4A:
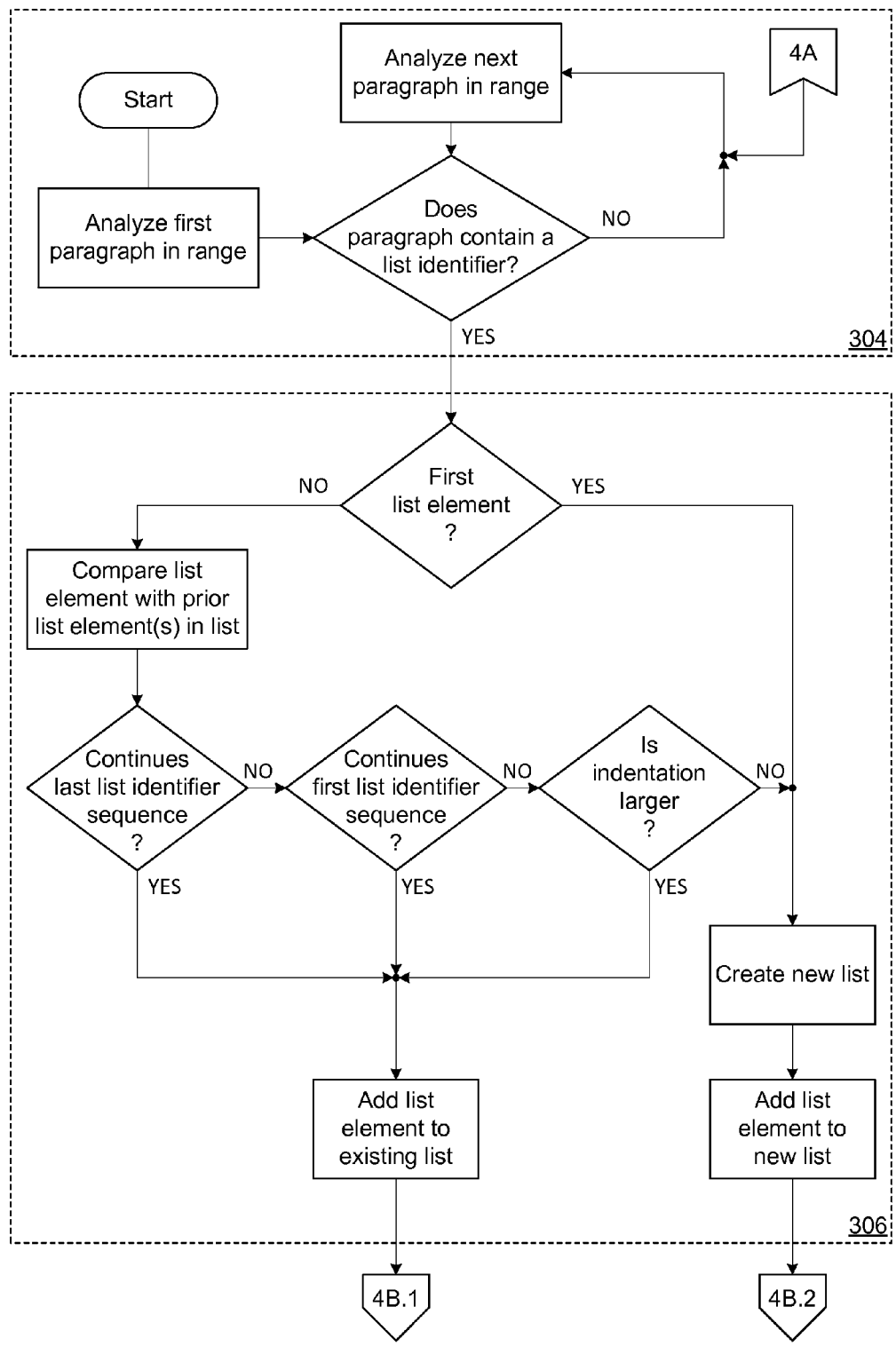
FIGS. 4A-4D form a flow chart showing the operation of one embodiment of the multi-level list detection engine in greater detail.
Figure 4B:
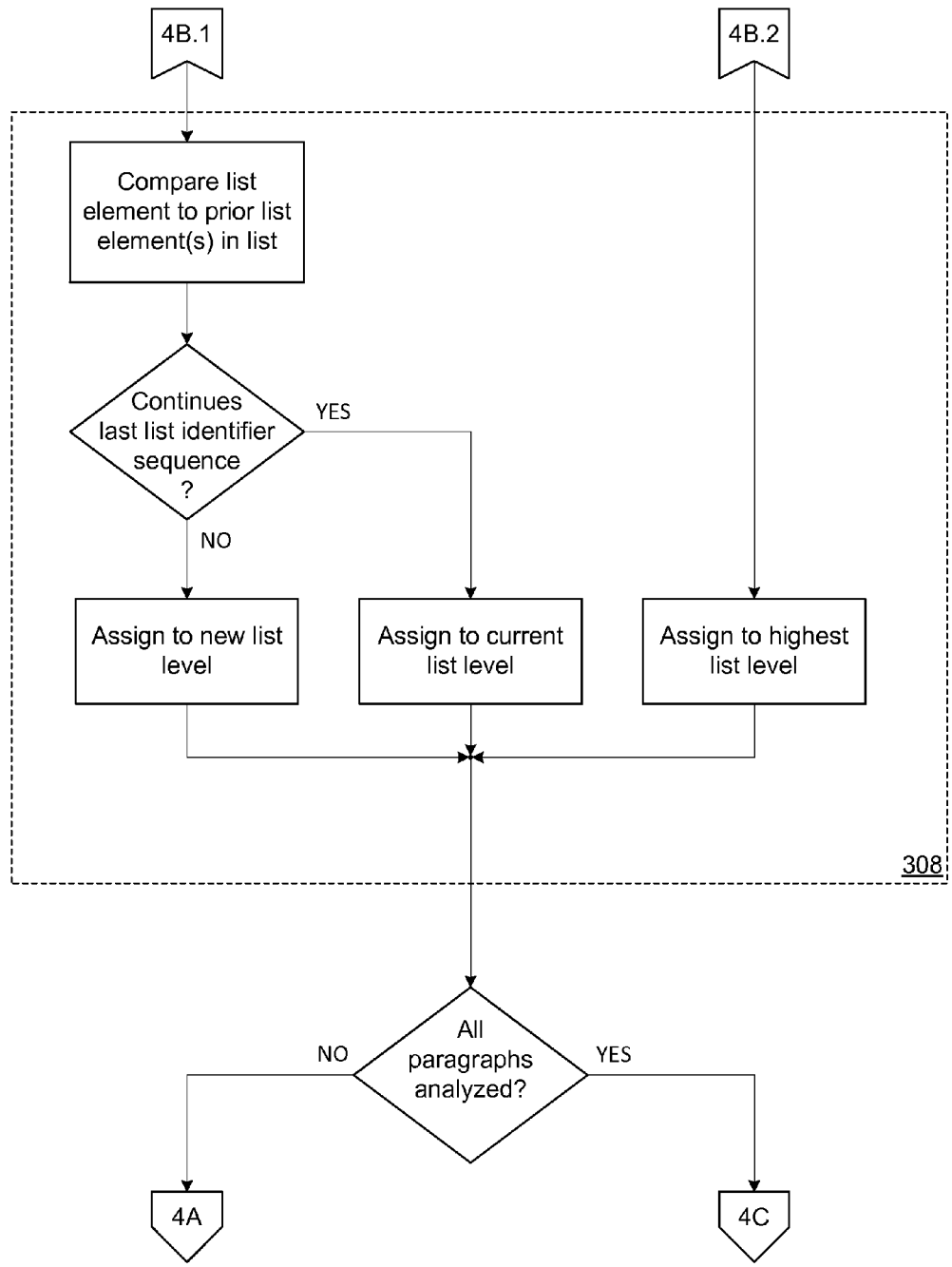
Figure 4C:
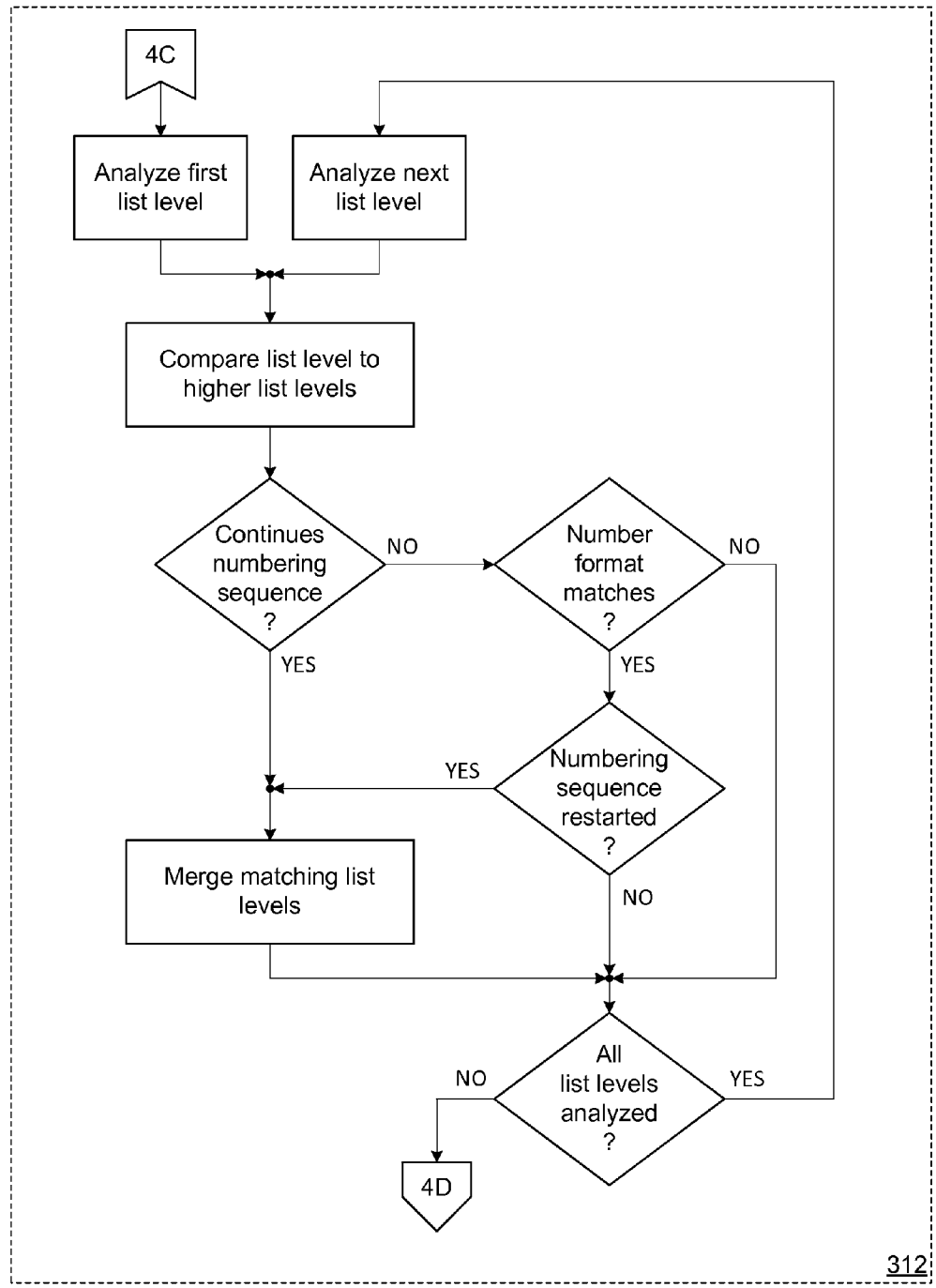
Figure 4D:
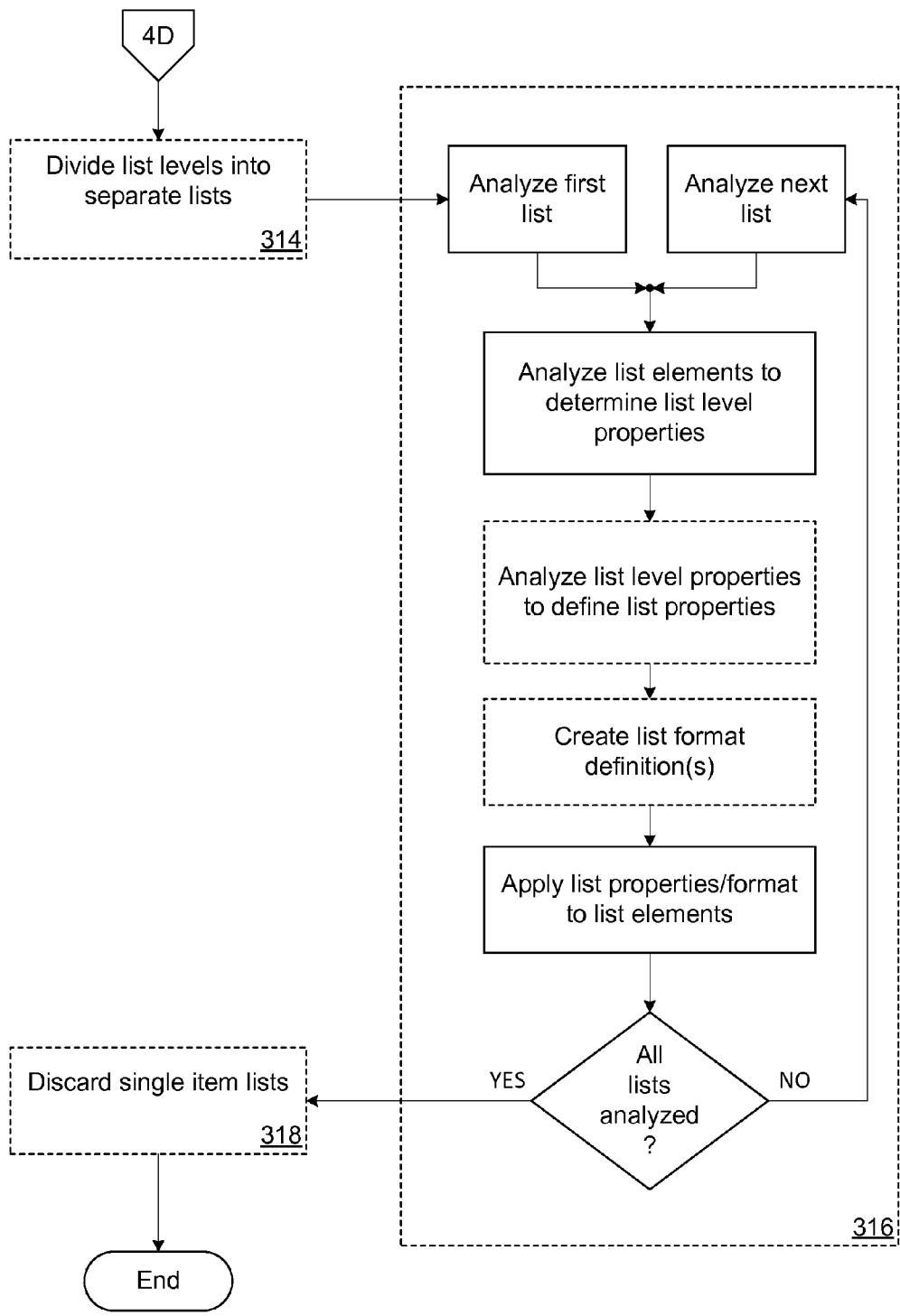

FIG. 3 is a flow chart showing one embodiment of the operation of the multi-level list detection engine 100, or the multi-level list detection method 300. The multi-level list detection method 300 includes the core list detection operations 302 and the post-processing operations 310. The core list detection operations 302 process the entire document to locate list elements, group the list elements into preliminary lists, and assign preliminarily list levels to the list elements. The post-processing operations 310 process the lists and list elements to refine the list level assignments, standardize the formats of the lists, and other refinement/maintenance operations. The multi-level list detection engine 100 operates on a range of text (e.g., all text in a document or a portion of the text in a document) grouped into text collections (e.g., paragraphs or lines) that are arranged in reading order. The multi-level list detection engine 100 updates the data store 116 with the list objects created from the source text. References to an object such as a "document" or a "paragraph" appearing in the following description are exemplary and used for readability and should not construed as limiting the invention. As used herein, the term "number" generally refers to any incrementally changing value or symbol including, but not limited to, numbers, letters, words, and symbols (i.e., bullets), and the term "numbering scheme" generally refers to any sequence or pattern involving such incremental values or symbols. Unless otherwise specified, the term "indentation" generally refers to the list identifier indentation of the object.

Initially, the multi-level list detection engine 100 performs the list identifier detection operation 304. In the list identifier detection operation 304, the multi-level list detection engine 100 identifies list elements based on the presence of a list identifier. In various embodiments, the multi-level list detection engine 100 analyzes each paragraph in the document for a list identifier. The illustrated exemplary document includes seven paragraphs ¶1-¶7. Paragraphs that are not detected as list elements are discarded from the set of paragraphs (or are not added to the set of list elements) and are not subject to further analysis by the multi-level list detection engine 100. In the various embodiments, the multi-level list detection engine 100 employs pre-defined comparison sets, heuristic analysis, or both to identify list identifiers.

Generally, a list identifier is one or more characters used to mark a list element. Most any character or sequence of characters can serve as a list identifier. Examples of characters recognized as list identifiers include sequenced characters (e.g., letters and numbers) and non-sequenced characters (e.g., symbols, such as "❖", "●", "■", "○", "✘", and "➤"). In various embodiments, the multi-level list detection engine 100 considers a character from the Unicode characters or character sets in the ranges including but not limited to, 25A0-25FF (geometric shapes) and 2700-27BF (dingbats) to be a list identifier. In various embodiments, the multi-level list detection engine 100 considers a character appearing in any of a number of selected fonts as a list identifier. Examples of fonts used for list identifiers include, but are not limited to, symbol typefaces (e.g., Zapf Dingbats® and Wingdings®). In some embodiments, the multi-level list detection engine 100 considers a punctuation character, a symbol, or other character that is not alphabetic or numeric and begins a paragraph as a list identifier. When detecting list identifiers, various embodiments of the multi-level list detection engine 100 consider separator characters and/or the amount of white space between the bullet/number and the text of the list element. Examples of separator characters, without limitation, include parenthesis, dashes, periods, and other symbols/punctuation characters.

In various embodiments, the multi-level list detection engine 100 recognizes both single number list identifiers and multi-number list identifiers. A single number list identifier has only a single incremental value in the list identifier. Examples include, without limitation, alphabetic sequences (e.g., a, b, . . . , aa, bb, . . . ), roman numeral sequences (i, ii, iii, . . . ), and Arabic numeral sequences (e.g., 1, 2, 3, . . . ), and symbol sequences (e.g., —, —, —). A multi-number list identifier includes a two or more independent incremental values that are distinct or separated by a delimiter. Examples include, without limitation, delimited multi-number sequences (e.g., 1.1, 1.1.1, . . . , 1.2, . . . ) and distinct multi-number sequences (e.g., A1, A2, . . . , B1, B2, . . . ). Distinct (i.e., not delimited) multi-number sequences often utilize mixed values (e.g., a letter-number combination), but mixed values are not required.

In various embodiments, the multi-level list detection engine 100 detects list identifiers by comparing sequences of characters beginning a paragraph against a predefined set of patterns, characters, and/or numbering schemes. Making comparisons against such predefined sets is useful, but not necessary, for identifying multi-character numbers that are not represented by a set of contiguous characters (i.e., without sequential character codes) and multi-number numbering schemes. An example, without limitation, of a multi-character numbers is roman numerals.

Some embodiments employ heuristic analysis to analyze sequences of characters beginning a paragraph that include some characteristic associated with a list identifier. Heuristic analysis is useful for identifying unique list identifiers that have not been predefined. Heuristic analysis generally employs character or pattern matching. In various embodiments, the heuristic analysis employed by the multi-level list detection engine 100 also considers properties including, but not limited to, some or all of the repetition of characters, words, or patterns between paragraphs, the presence of an identifiable delimiter or separator character (e.g., punctuation), the amount of white space following the list identifier candidate, the presence of a repeating prefix or suffix, the position of the list identifier candidate with the paragraph, the font of the list identifier candidate, the style or formatting (e.g., bold, italic, underline, font size) of the list identifier candidate, the presence of an identifiable incrementing value, and/or the existence of an identifiable numbering scheme. In various embodiments, repeating patterns must appear in two or more paragraphs before being accepted as a list identifier by the multi-level list detection engine 100. For example, a multi-level list using a numbering scheme that inserts a word or phrase from a limited set of words or phrases (e.g., "Chapter", "Section", or "Verse") before or after the list identifier at the start of a selected number of list elements is detectable through heuristic analysis by some embodiments of the multi-level list detection engine 100.

Following the list identifier detection operation 304, the multi-level list detection engine 100 performs the list element grouping operation 306. In the list element grouping operation 306, the multi-level list detection engine 100 groups list elements into lists based on a comparison of one or more selected properties of that list element with selected properties of one or more list elements already in the list, either individually or in an aggregated form. If a list element does not fit in an existing list, the multi-level list detection engine 100 creates a new list. In various embodiments, the multi-level list detection engine 100 attempts to add each list element to a list as it is identified. In other embodiments, all list elements are identified before the multi-level list detection engine 100 attempts to group the list elements into lists.

Generally, the first list element identified by the multi-level list detection engine 100 begins the first list. When the next list element is identified, the multi-level list detection engine 100 then determines whether to add the newly identified list element to the current list or to create a new list. In various embodiments, the newly identified list is added to the existing list if the newly identified list element (1) continues the numbering sequence started by the previous list element, (2) continues the numbering sequence started by the first list element, or (3) has a list identifier indentation greater than the average value of the list identifier indentations of those list elements that are part of the numbering sequence started by first list element in the list. In other embodiments, the minimum conditions for inclusion of a list element into an existing list are that (1) the list identifier indentation of the list identifier cannot be less than the list identifier indentation of the first list element list identifier in the list, and (2) if the indentation is the same, the list identifiers must have the same format and form the numbering sequence in some numbering scheme. If the minimum conditions are not met, the multi-level list detection engine 100 creates a new list and puts the newly detected list element in that new list. Some embodiments of the multi-level list detection engine require all list elements in a list to be consecutive paragraphs and, consequently, create a new list whenever the paragraph immediately preceding the list element is not a list element itself. Other embodiments allow one or more non-list-element paragraphs to exist between two consecutive list elements. In various embodiments, the number of non-list-element paragraphs allowed exist between two consecutive list elements is pre-defined. In some embodiments, the multi-level list detection engine 100 compares the identified list element to one or more prior list elements of the current list, either individually or in an aggregated form. In other embodiments, the multi-level list detection engine 100 compares the identified list element to one or more prior list elements of the all existing lists, either individually or in an aggregated form. When comparing properties that have continuous values (e.g., indentation or amount of white space), various embodiments of the multi-level list detection engine 100 apply relaxed comparisons by applying tolerances, rounding, and/or using a threshold based analysis. Such relaxed comparisons allow for reasonable variations due to factors such as scanning variations and original document quality.

After the grouping operation 306, the multi-level list detection engine 100 performs the level assignment operation 308. In the level assignment operation 308, the multi-level list detection engine 100 assigns a preliminary list level to each list element based on a comparison of selected properties of that list element with selected properties of one or more of the list elements in the same list. In various embodiments, the multi-level list detection engine 100 assigns a list level to each list element as it is added to a list. In other embodiments, all list elements are added to lists before the multi-level list detection engine 100 assigns list levels. Generally, the first list element added to a new list is assigned to the highest list level.

In various embodiments, the preliminary list level assignment is based on whether or not the list identifier of the current list element continues the sequence of one or more previous list elements. In some embodiments, if the list identifier of the current list element follows the list identifier of the previous list element, the current list element is assigned the same list level as the previous list element, and, if not, the current list element is assigned to a new preliminary list level. In other embodiments, the preliminary list level assignment is based on the relative indentation of the list identifiers in the current list element and the previously identified list element. If the indentation of the current list element list identifier and the indentation of the previous list element list identifier are different or not of the same format, the current list element is assigned to a new preliminary level. If the list identifier indentations and formats are the same, the same list level is assigned only if the current list element list identifier sequentially follows the previous list element list identifier. Otherwise, the current list element is assigned to new list level.

The multi-level list detection engine 100 repeats the list identifier detection operation 304, the grouping operation 306, and the level assignment operation 308 for each paragraph in the document. As previously mentioned, some embodiments of the multi-level list detection engine 100 perform the operations on a per paragraph basis (i.e., each applicable operation is performed on a single paragraph before processing the next paragraph) and other embodiments process the paragraphs on a per operation basis (i.e., one operation is performed on each paragraph before beginning the next operation).

After processing each paragraph, the multi-level list detection engine 100 performs post-processing operations 310 on the list elements. At the conclusion of the post-processing operations 310, if any multi-level list has been identified, the data store 116 contains one or more multi-level list objects ready for serialization with all list elements grouped into lists and properly leveled and optionally produces a list format definition for each list. In various embodiments, the multi-level list detection engine 100 performs the post-processing operations 310 on all list elements on a per list basis, across all lists, or both.

The post-processing operations 310 include a level correction and merging operation 312. In the level correction and merging operation 312, the multi-level list detection engine 100 analyzes all of the list elements on a per list basis and makes corrections to list level assignments as necessary. In various embodiments, the multi-level list detection engine 100 compares selected properties of the list elements belonging to one list level with those same properties of the list elements belonging to another list level within the same list, either individually or in an aggregated form and merges list levels with matching properties into a single list level. During the preliminary list level assignment, consecutive list elements having matching values for selected properties (e.g., list identifier indentation, list identifier format, and continuous number sequencing) are grouped into the same list level. However, non-consecutive list elements that do not necessarily have continuous number sequencing but have matching values for other selected properties (e.g., indentation and list identifier format) potentially belong to the same list level. For example, in many lists, the number sequence for the second and lower list levels restarts following the appearance of a higher list level list element in the list. The multi-level list detection engine 100 compares the sequencing of list levels groups that have the same values for selected properties. If the subsequent list level group continues the numbering sequence started in the earlier list level, the list level groups are merged. Similarly, if the earlier list level and the subsequent list level have separate numbering sequences beginning with the same value (i.e., the subsequent list level restarts the numbering sequence) and there is at least one list element of higher level between those sequences, the list level groups are merged. In various embodiments, the subsequent list level is made part of the earlier (i.e., higher) list level. Accordingly, merging the list levels also results in correction of the preliminary list level assignment. Moreover, in embodiments where paragraphs that are not list elements are allowed to exist between list elements, merging the list levels also results in merging of lists. Although various embodiments of the multi-level list detection engine 100 group the list elements into the fewest number of list levels needed to maintain the numbering and/or formatting unique to the list, it is not required that the number of list levels be minimized to achieve useful results. By minimizing the number of list levels, document complexity is reduced and list level formatting is consistent, which results in a flow format document that is easier for the user to edit and maintain.

The multi-level list detection engine 100 tries to merge as many list levels as possible. If there are list levels that cannot be merged, but have some (not all) selected properties same, they are left unmerged. In lists with unmerged list levels, those unmerged list levels that have same values for some selected properties become competing candidates for the same list level within the final list. After all merging is finished, the competing list level candidates are analyzed based on one or more selected properties to determine which list level candidate to assign to the disputed list level. The losing candidates are considered anomalies and are placed in their own lists or discarded.

In some embodiments, the post-processing operations 310 include a list separation operation 314. This is done after all merging in a list is finished. The list separation operation 314 divides one list into two or more lists by moving one or more list levels into a new list. In some embodiments, if there are two list levels with the same list identifier indentation in the same list, one of them is moved into separate list for various reasons including making the structure of resulting document more intuitive to the end-user or accommodating limitations on the number of levels in a single list imposed by the target flow format document. In some embodiments, a list is separated into multiple lists to accommodate limitations on the number of list levels in a single list that are imposed by the target flow format document. For example, if the target flow format document limits a list to having nine list levels, the multi-level list detection engine 100 moves the list levels 10 through 18 into one or more new list(s).

In some embodiments, the multi-level list detection engine 100 compares selected properties of each list element to those selected properties of other list elements within the same list, either individually or in an aggregated form, to make list level corrections to individual list elements or groups of list elements prior to the list level merging operation. In various embodiments, the selected properties include the some or all of the same properties (i.e., relative indentation, common format, and/or sequential numbering) used in the list identifier detection operation 304, the grouping operation 306, and/or the level assignment operation 308. In addition, sequence analysis also considers the presence of intervening higher list levels that result in resetting of the list level sequence.

In various embodiments, the post-processing operations 310 include a list format standardization operation 316. Typically, the list format standardization operation 316 occurs after the level correction operation 312. A list format includes some or all of the properties of the list including, but not limited to, the numbering style of the list identifier on a per level basis, the appearance (i.e., style) of the list identifier on a per level basis, the alignment of the list element on a per level basis, the white space following each list identifier on a per level basis, the indentation of the list identifier on a per level basis, the indentation of each list identifier relative to the next higher level on a per list basis, the indentation of the list element text on a per level basis, the indentation of list element text of each list element relative to the next higher level on a per list basis, and the higher level that causes the list identifier numbering of the current level to restart. The multi-level list detection engine 100 determines these properties by analyzing the corresponding properties of each list element in a list having the same list level. In various embodiments, the controlling values of the properties are determined using some or all of criteria including, but not limited to, the value shared by majority of paragraphs and the average value of the characteristic for all paragraphs. In some embodiments, the controlling values of the properties within a given tolerance (e.g., using thresholds) are translated to nominal values (e.g., standard indentations of 0.5 in). After being determined, the standardized list format properties are optionally applied to the list elements for consistency. In various embodiments, some or all of the list format properties are assembled into a list format definition that describes the list. The list format properties and/or the list format definitions are also available for later use by the multi-level list detection engine.

Another optional aspect of the post-processing operations 310 is the discarding single item lists/levels operation 318. Generally, the additional complexity and overhead of a multi-level list is not necessary for a single list element list or a single list element list level. Basic paragraph formatting is often sufficient for such cases. In various embodiments, a list containing a single list element is discarded. In some embodiments, additional criteria are employed to determine whether or not to discard a list containing a single list element. By way of non-limiting examples, a single item list might be discarded only if the list identifier is a bullet, only if list identifier is not an Arabic numeral, or only if the list identifier is not "1." In various embodiments, any list level containing only one list element is removed from the list, regardless of the rest of the list. In other embodiments, all list levels in the list are analyzed to determine whether to discard a list level containing a single list element. In some embodiments, the whole list is discarded if all list levels each have only a single list element.

Figure 5:
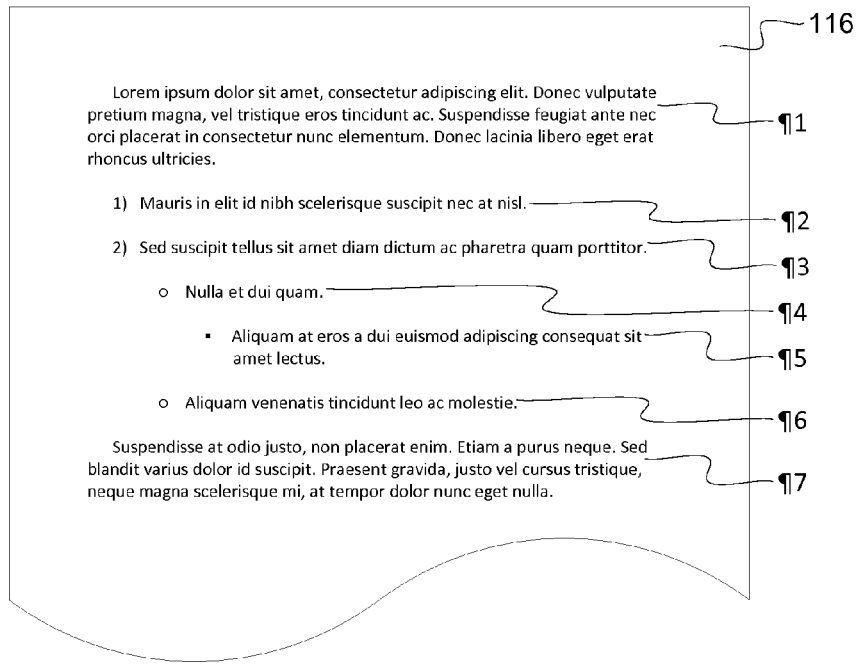
FIG. 5 graphically illustrates an exemplary fixed format document containing a static multi-level list.
Figure 6A:
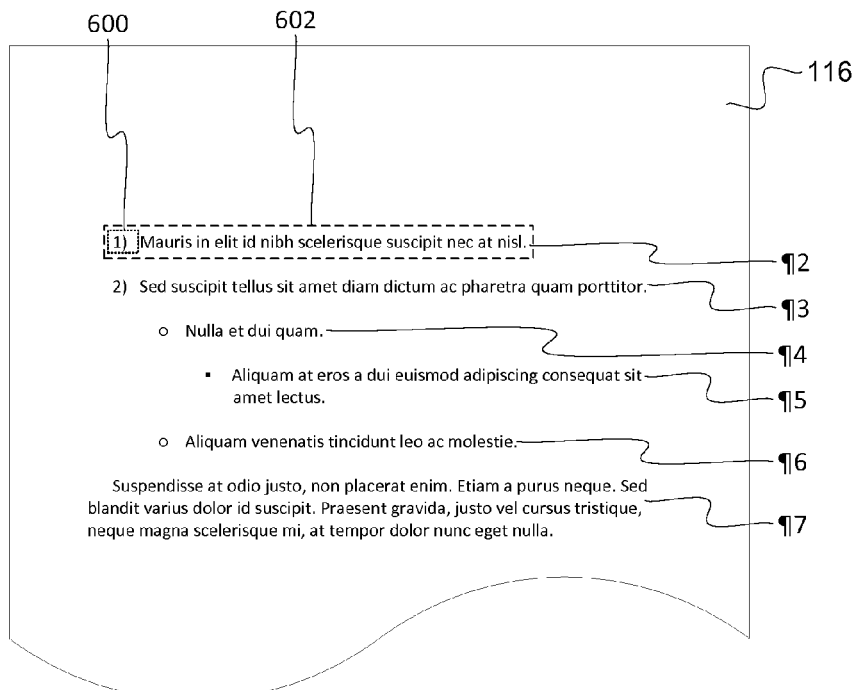
FIGS. 6A-6F graphically illustrate operation of the multi-level list detection engine of on the exemplary fixed format document of FIG. 5.
Figure 6B:
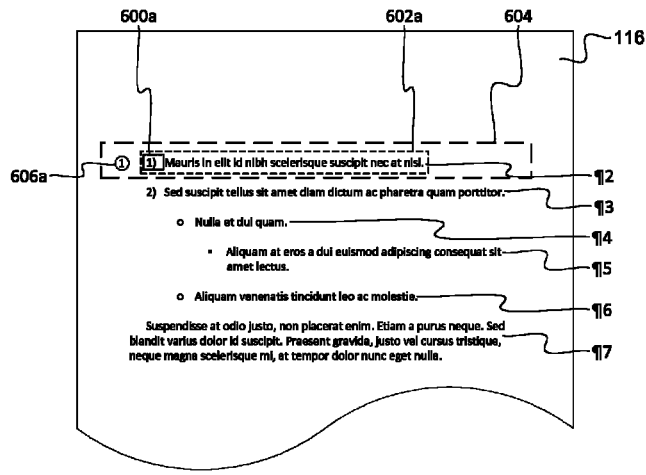

FIG. 5 illustrates exemplary paragraphs ¶1-¶7 (i.e., text) extracted from a page of a fixed format document containing a static multi-level list. The operation of one embodiment of the multi-level list detection engine 100 on the exemplary paragraphs ¶1-¶7 is graphically illustrated in FIGS. 6A-6F. The multi-level list detection engine 100 begins by analyzing the first paragraph ¶1 of the document to determine if it contains a list identifier. The first paragraph ¶1 does not contain any list identifiers and is not identified as a list element. No further processing of the first paragraph ¶1 is required, so operation continues with analysis of the second paragraph ¶2. The list identifier "1)" 600a appears in the second paragraph ¶2, so the second paragraph ¶2 is flagged as a list element 602a. Next, the multi-level list detection engine 100 attempts to add the list element 602a to an existing list. In this case, the second paragraph ¶2 is the first list element identified and no list exists yet. Accordingly, the multi-level list detection engine 100 creates a new list 604 and adds the second paragraph ¶2 to the new list. Because the second paragraph ¶2 is the first item in the new list, the multi-level list detection engine 100 assigns the second paragraph ¶2 to the highest list level 606a (e.g., list level 1). The result of these operations is illustrated in FIG. 6B.

Figure 6C:
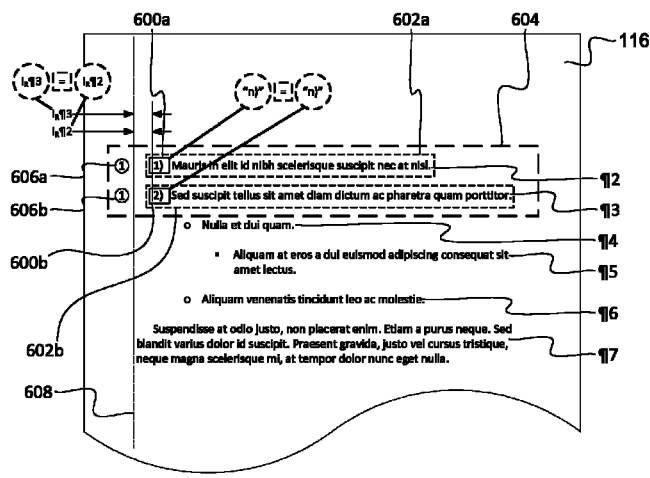

After assigning the second paragraph ¶2 to a list level, the multi-level list detection engine 100 repeats the process for each additional paragraph in the document. The third paragraph ¶3 contains the list identifier "2)" 600b and is identified as a list element. Because the list identifier of the third paragraph ¶3 has the same format, "n)", as the list identifier of the second paragraph ¶2 and continues numbering sequence started by second paragraph ¶2, the third paragraph ¶3 is added to the existing list 604 and is assigned to the same list level 606b as the second paragraph 2. The cumulative result of these operations is illustrated in FIG. 6C.

Figure 6D:
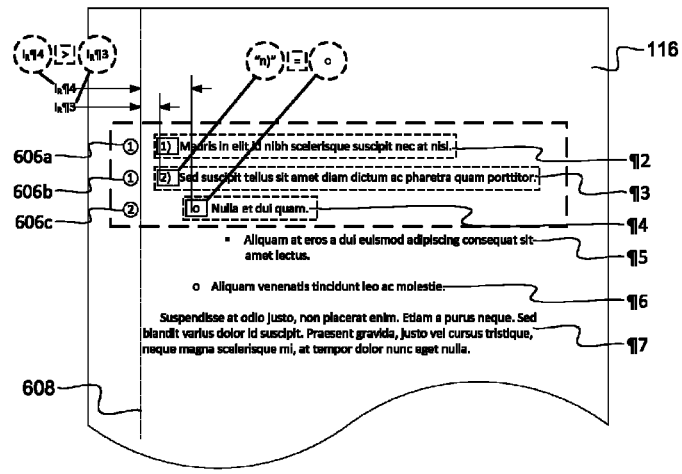

The fourth paragraph ¶4 contains the list identifier "○" 600c and is identified as a list element 602c. The fourth paragraph ¶4 is added to the existing list 604 because the indentation of its list identifier 600c is larger than the average value of the list identifier indentations of those list elements that belong to the numbering sequence started by first list element (¶2). Because the list identifier of the fourth paragraph ¶4 does not continue the numbering sequence formed by the previous two paragraphs (¶2 and ¶3), the fourth paragraph ¶4 is assigned to another list level 606c than the third paragraph ¶3 (i.e., list level 2). The cumulative result of these operations is illustrated in FIG. 6D.

The fifth paragraph ¶5 contains the list identifier "m" and is identified as a list element. The fifth paragraph ¶5 is added to the existing list 604 because the indentation of its list identifier 600d is larger than the average value of the list identifier indentations of those list elements that form numbering sequence started by first list element (¶2). Because the list identifier of the fifth paragraph ¶5 does not continue the numbering sequence formed by the previous paragraph (¶4), the fifth paragraph ¶5 is assigned to another list level than the fourth paragraph ¶4 (i.e., list level 3).

The sixth paragraph ¶6 includes the same list identifier as the fourth paragraph ¶4, "○", and is identified as a list element. The sixth paragraph ¶6 is added to the existing list 604 because the indentation of its list identifier 600e is larger than the average value of the list identifier indentations of those list elements that form numbering sequence started by first list element (¶2). Because the format of list identifier of the sixth paragraph ¶6 is not the same as that of the list identifier of the fifth paragraph ¶5, the sixth paragraph ¶6 is assigned to another list level than the fifth paragraph ¶5 (i.e., list level 4).

Figure 6E:
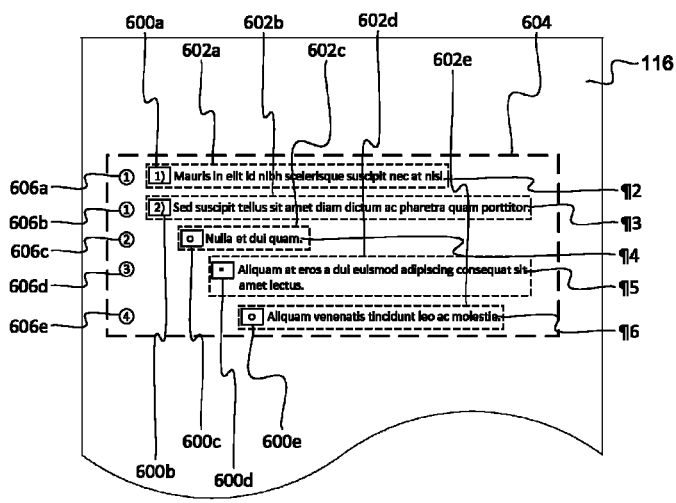

The seventh paragraph ¶7 does not contain any list identifiers and is not identified as a list element. No further processing of the seventh paragraph ¶7 is required. As there are no additional paragraphs in the document, the multi-level list detection engine 100 is ready to perform the post-processing operations 310 on the detected multi-level list. The cumulative result of these operations is illustrated in FIG. 6E.

During post-processing, the multi-level list detection engine 100 compares the properties of all list elements in the list 604. The second paragraph ¶2 and the third paragraph ¶3 have a smaller list identifier indentation than the remaining paragraphs. Accordingly, the list level containing the second paragraph ¶2 and the third paragraph ¶3 (i.e., the highest list level) is not merged into another list level.

The fourth paragraph ¶4 does not have the same list identifier indentation, have the same list identifier format, or continue the numbering sequence of a higher list level. Accordingly, the list level containing the fourth paragraph ¶4 is not merged with another list level. Similarly, the fifth paragraph ¶5 does not have the same list identifier indentation, have the same list identifier format, or continue the numbering sequence of a higher list level. Accordingly, the list level containing the fifth paragraph ¶5 is not merged into another list level.

Figure 6F:
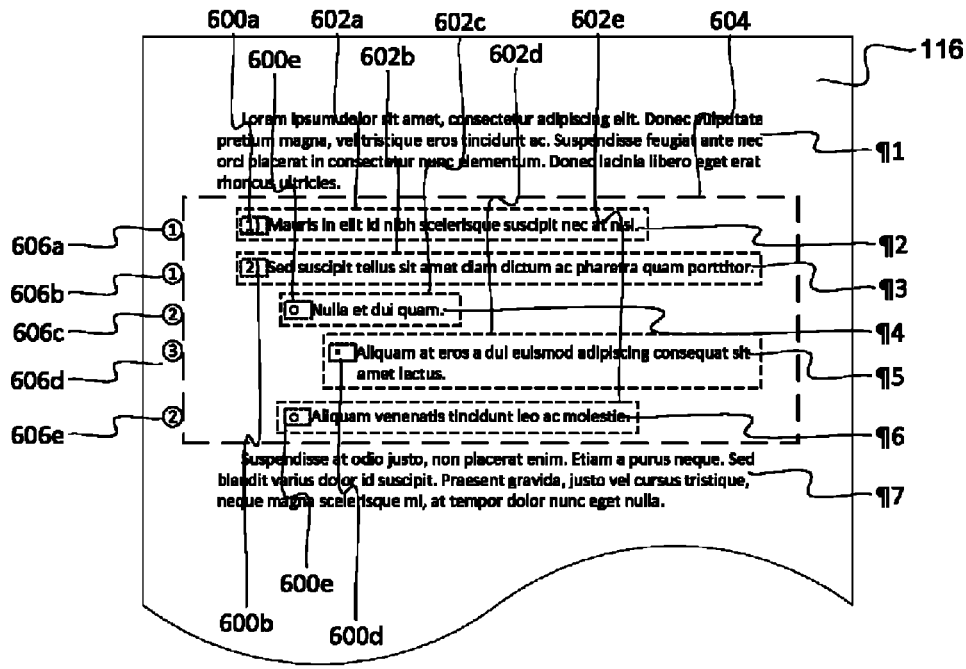

The sixth paragraph ¶6 has the same list identifier indentation as the fourth paragraph ¶4. Further, the list identifier of the sixth paragraph ¶6 has the same format as and continues the number sequence of the fourth paragraph ¶4. Accordingly, the list level containing the sixth paragraph ¶6 is merged with the list level containing the fourth paragraph ¶4 during the post-processing operations 310. The final list object appearing in the data store as the cumulative result of these operations is illustrated in FIG. 6F.

Figure 7:
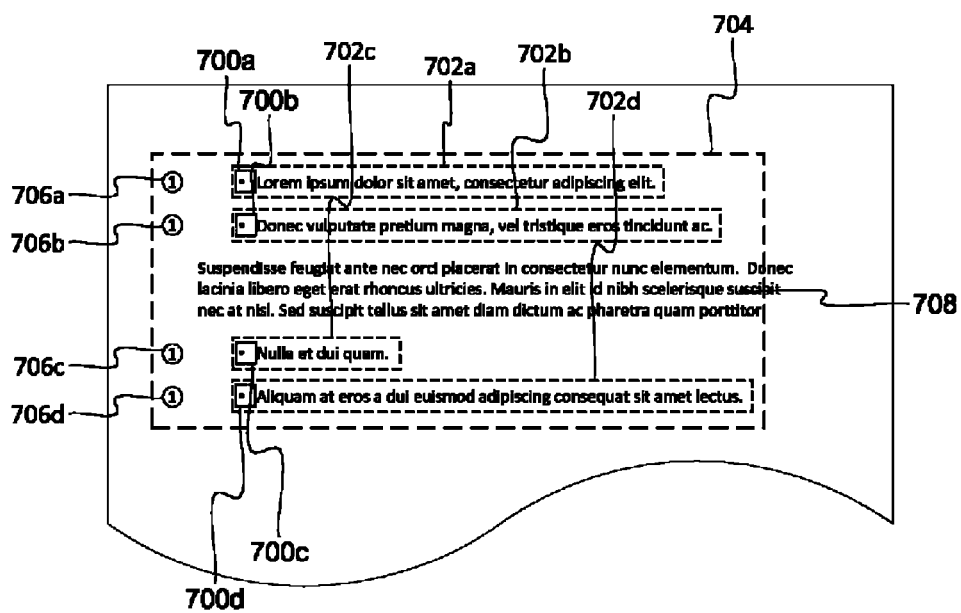
FIG. 7 graphically illustrates another exemplary document containing a badly formed list with the anomalous list element placed in its own list nested within the multi-level list detection engine.

In many cases, the list elements in a multi-level list appear in the text as successive paragraphs, as shown in FIGS. 5 and 6A-6F. FIG. 7 illustrates an exemplary document containing a single multi-level list 704 containing two sections of list elements 702a-d with common formats and common list levels 706a-d. The two sections are separated by a non-list paragraph 708. The multi-level list detection engine 100 is capable of identifying multi-level lists across the entire document even when non-list paragraphs 708 appear between list elements 702a-d. In various embodiments of the multi-level list detection engine 100, the list elements 702c, 702d would be added to the list 704 as part of the core multi-level list detection operations 302 because the list identifiers 700a-d of the consecutive list elements share the same indentation and formatting.

Figure 8:
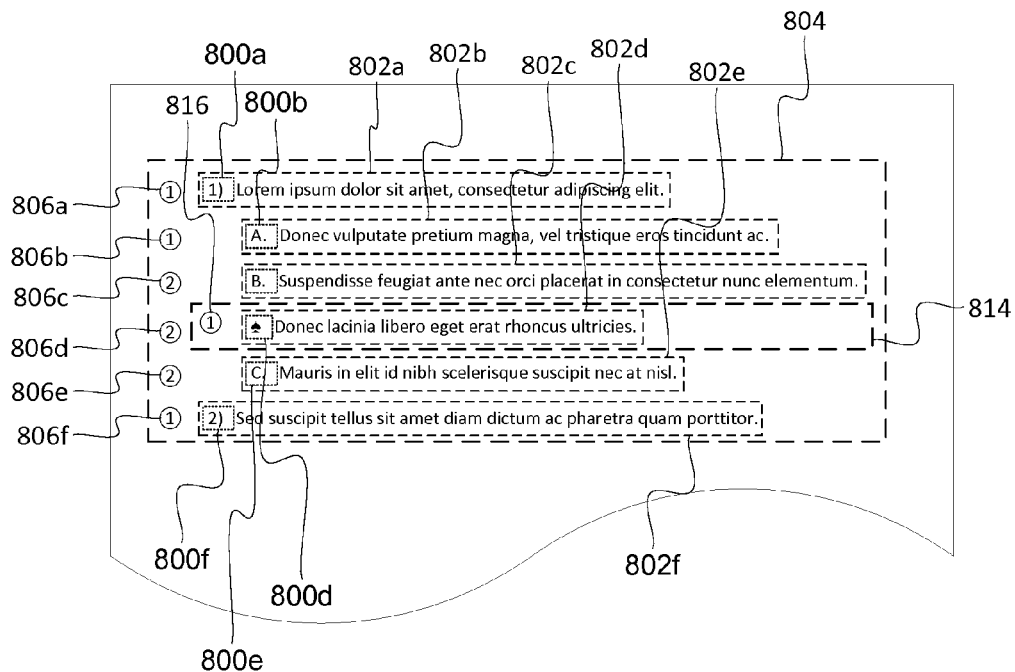
FIG. 8 graphically illustrates another exemplary document containing single multi-level list with two sections having common formats separated by non-list paragraphs.

The multi-level list detection engine 100 is robust enough to deal with a badly formed multi-level list without the need for additional logic tailored to special cases. FIG. 8 illustrates an exemplary document containing a badly formed multi-level list 804 with a well-structured list flow that is interrupted by an anomalous list element 802d. The anomalous list element 802d at the second list level 806d that begins with "4" and interrupts the well-structured list flow created by the other list elements 802a-c, 802e, and 802f at list levels 806a-c, 806e, and 806f. In various embodiments, after list element grouping operation, paragraphs 806b and 806c will be in one list level, while paragraph 806d will be in another level. Paragraph 806e will be in yet another list level. In level correction and merging phase, the multi-level list detection engine 100 groups all three list levels because they have the same selected properties (i.e., indentation), but will be able to merge only those list levels with alphabetic numbering scheme. At this point, the list will have two list levels that are candidates to be the second list level of the final list, one containing paragraphs 806b, 806c and 806e and one containing paragraph 806d. The multi-level list detection engine 100 selects the list level to become the second list level based on analysis of selected properties of both second list level candidates. In the illustrated embodiment, the list level containing paragraphs 806b, 806c and 806e is selected as the second list level because it contains a greater number of list elements. The other candidate (i.e., the list level containing paragraph 806d) is considered anomaly, and moved to its own list. In some embodiments, the single item list containing the anomaly may be discarded and the anomaly formatted using basic paragraph formatting during the discarding single item lists/levels operation 318.

The multi-level list detection engine 100 benefits an end user by converting a static multi-level list from a fixed format source document into a dynamic multi-level list object in a flow format document. The dynamic multi-level list object generated by the multi-level list detection engine 100 automatically updates as list elements are added or removed by the end user rather than requiring the user to renumber the list elements. When an end user inserts a new list element, the dynamic multi-level list object automatically adds the appropriate list identifier and applies the appropriate formatting to the new list element based on the list level. Further, the end user can quickly apply a list format change to the dynamic multi-level list object rather than having to edit the format of each individual list element. Moreover, the list elements are hierarchically organized, which allows additional analysis to be performed.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

Figure 9:
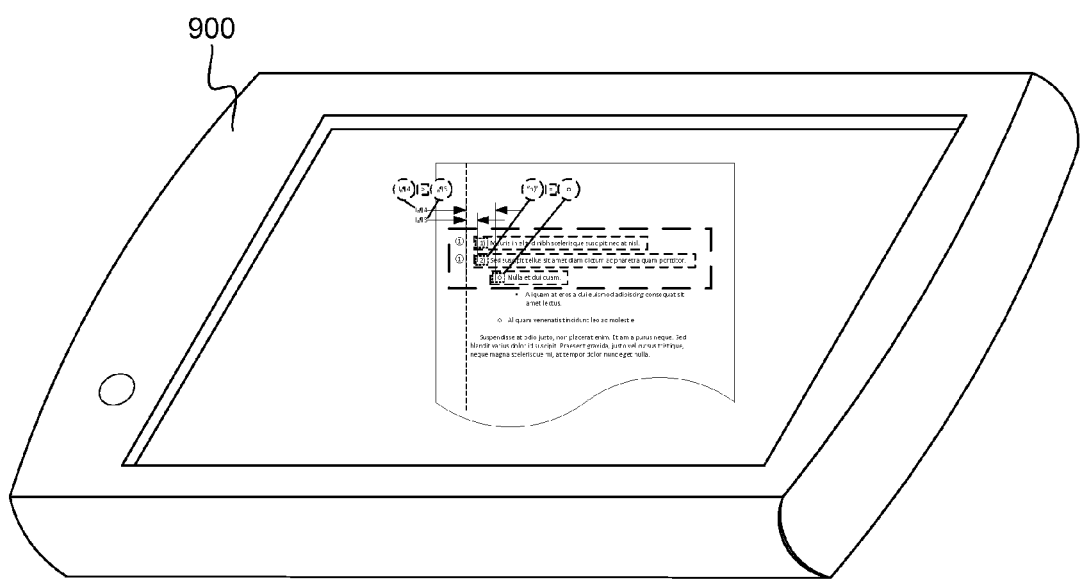
FIG. 9 illustrates an exemplary tablet computing device executing an embodiment of the multi-level list detection engine.
Figure 10:
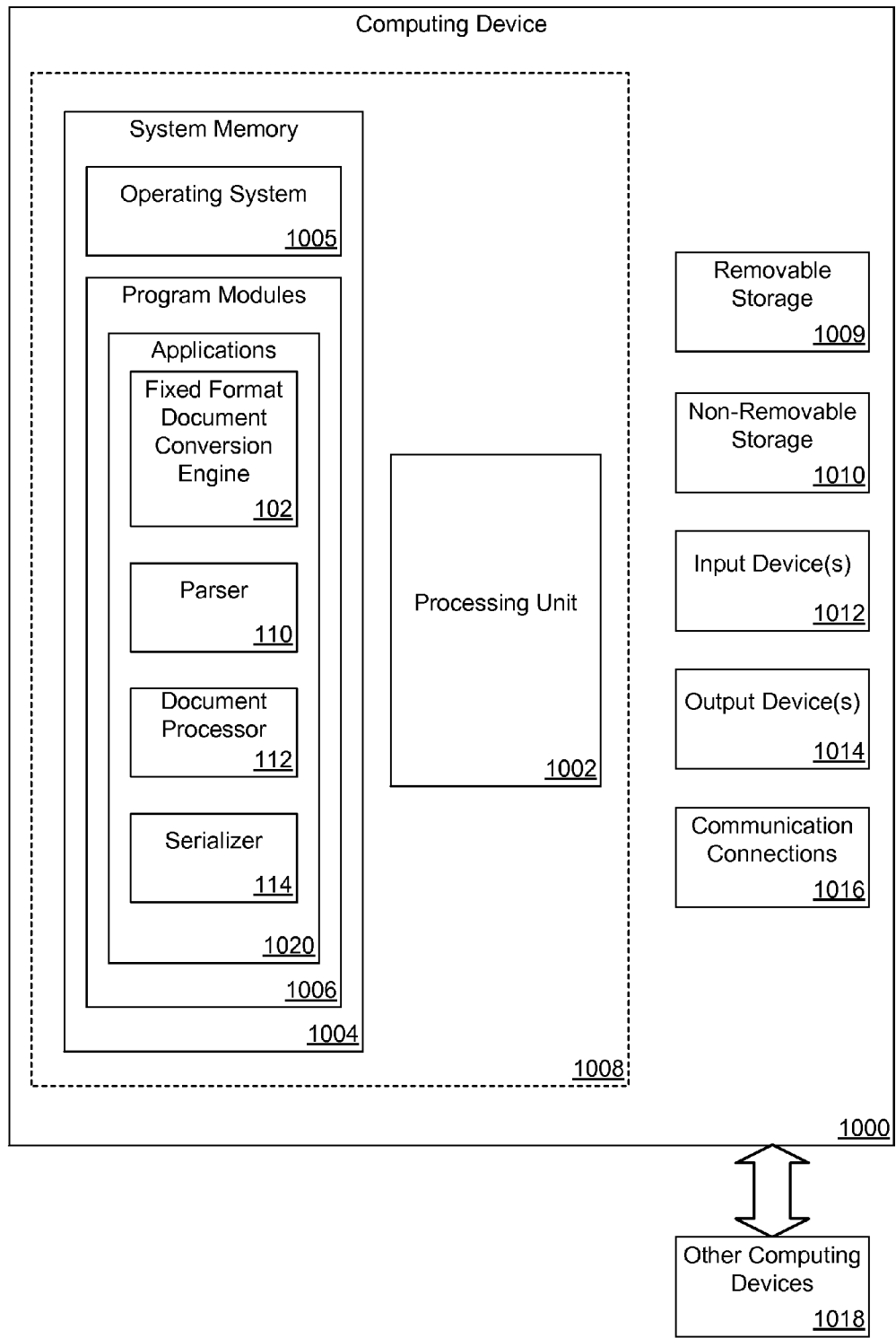
FIG. 10 is a simplified block diagram of an exemplary computing device suitable for practicing embodiments of the multi-level list detection engine.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. FIG. 9 illustrates an exemplary tablet computing device 900 executing an embodiment of the multi-level list detection engine 100. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 10 through 12 and the associated descriptions provide a discussion of a variety of operating environments in which embodiments of the invention may be practiced. However, the devices and systems illustrated and discussed with respect to FIGS. 10 through 12 are for purposes of example and illustration and are not limiting of a vast number of computing device configurations that may be utilized for practicing embodiments of the invention, described herein.

FIG. 10 is a block diagram illustrating physical components (i.e., hardware) of a computing device 1000 with which embodiments of the invention may be practiced. The computing device components described below may be suitable for the computing devices described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running software applications 1020 such as the multi-level list detection engine 100, the parser 110, the document converter 102, and the serializer 114. The operating system 1005, for example, may be suitable for controlling the operation of the computing device 1000. Furthermore, embodiments of the invention may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., the multi-level list detection engine 100, the parser 110, the document processor 112, and the serializer 114) may perform processes including, but not limited to, one or more of the stages of the multi-level list detection method 300. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the multi-level list detection engine 100, the parser 110, the document processor 112, and the serializer 114 may be operated via application-specific logic integrated with other components of the computing device 1000 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1000 may also have one or more input device(s) 1012 such as a keyboard, a mouse, a pen, a sound input device, a touch input device, etc. The output device(s) 1014 such as a display, speakers, a printer, etc. may also be included. The aforementioned devices are examples and others may be used. The computing device 1000 may include one or more communication connections 1016 allowing communications with other computing devices 1018. Examples of suitable communication connections 1016 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 1004, the removable storage device 1009, and the non-removable storage device 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 1000. Any such computer storage media may be part of the computing device 1000.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
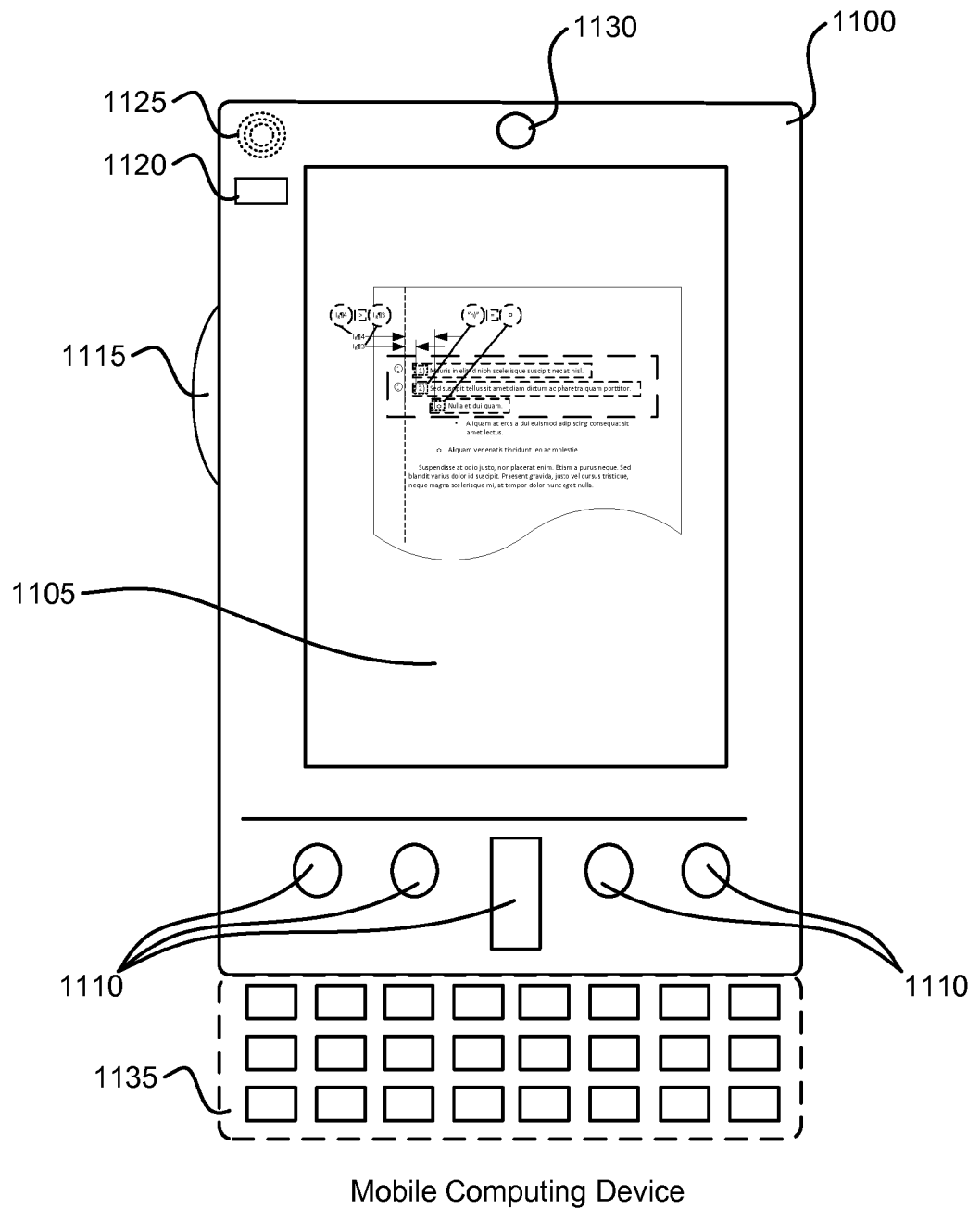
FIG. 11A illustrates one embodiment of a mobile computing device executing one embodiment of the multi-level list detection engine.
Figure 11B:
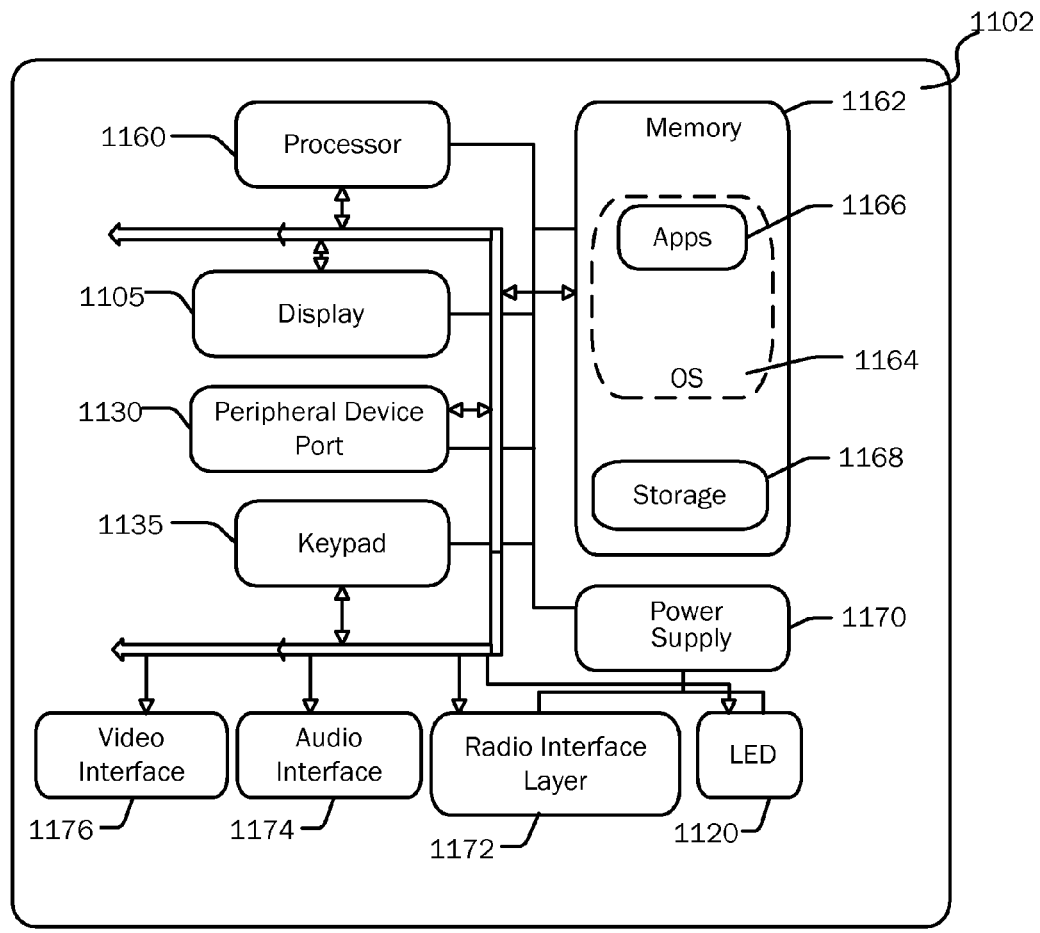
FIG. 11B is a simplified block diagram of an exemplary mobile computing device suitable for practicing embodiments of the multi-level list detection engine.
Figure 12:
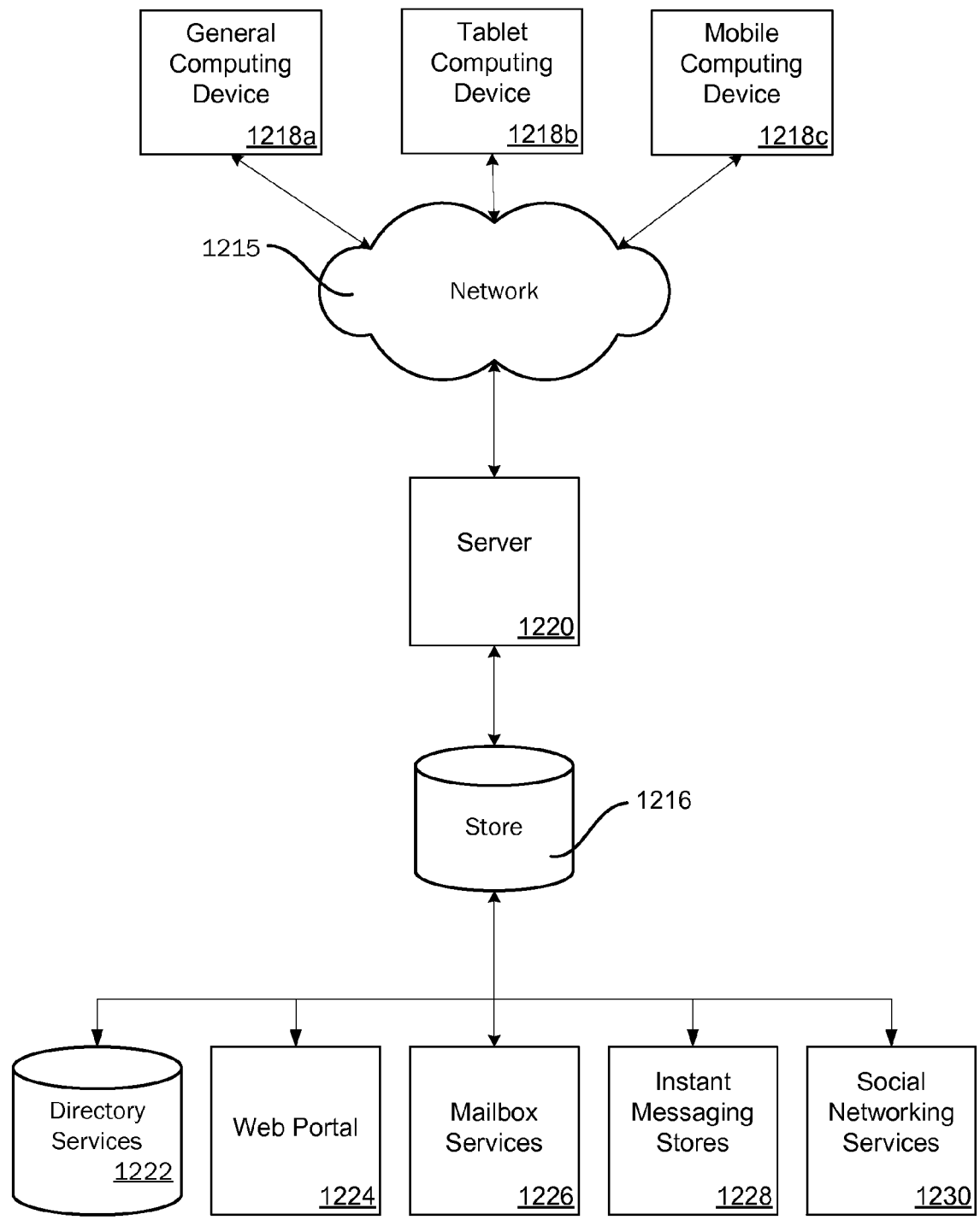
FIG. 12 is a simplified block diagram of an exemplary distributed computing system suitable for practicing embodiments of the multi-level list detection engine.

FIGS. 11A and 11B illustrate a mobile computing device 1100, for example, a mobile telephone, a smart phone, a tablet personal computer, a laptop computer, and the like, with which embodiments of the invention may be practiced. With reference to FIG. 11A, an exemplary mobile computing device 1100 for implementing the embodiments is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative embodiments, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some embodiments, the mobile computing device 1100 incorporates a vibration transducer for providing the user with tactile feedback. In yet another embodiment, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one embodiment of a mobile computing device. That is, the mobile computing device 1100 can incorporate a system (i.e., an architecture) 1102 to implement some embodiments. In one embodiment, the system 1102 is implemented as a "smart phone" capable of running one or more applications (e.g., browser, e-mail, calendaring, contact managers, messaging clients, games, and media clients/players). In some embodiments, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the multi-level list detection engine 100, the parser 110, the document processor 112, and the serializer 114 described herein.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio 1172 that performs the function of transmitting and receiving radio frequency communications. The radio 1172 facilitates wireless connectivity between the system 1102 and the "outside world," via a communications carrier or service provider. Transmissions to and from the radio 1172 are conducted under control of the operating system 1164. In other words, communications received by the radio 1172 may be disseminated to the application programs 1166 via the operating system 1164, and vice versa.

The radio 1172 allows the system 1102 to communicate with other computing devices, such as over a network. The radio 1172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 1102 provides notifications using the visual indicator 1120 that can be used to provide visual notifications and/or an audio interface 1174 producing audible notifications via the audio transducer 1125. In the illustrated embodiment, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present invention, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168. Computer storage media may include volatile and nonvolatile, removable and non-removable media implemented in any method or technology for storage of information, such as computer readable instructions, data structures, program modules, or other data.

Data/information generated or captured by the mobile computing device 1100 and stored via the system 1102 may be stored locally on the mobile computing device 1100, as described above, or the data may be stored on any number of storage media that may be accessed by the device via the radio 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio 1172 or via a distributed computing network. Similarly, such data/information may be readily transferred between computing devices for storage and use according to well-known data/information transfer and storage means, including electronic mail and collaborative data/information sharing systems.

FIG. 12 illustrates one embodiment of the architecture of a system for providing the multi-level list detection engine 100, the parser 110, the document processor 112, and the serializer 114 to one or more client devices, as described above. Content developed, interacted with or edited in association with the multi-level list detection engine 100, the parser 110, the document processor 112, and the serializer 114 may be stored in different communication channels or other storage types. For example, various documents may be stored using a directory service 1222, a web portal 1224, a mailbox service 1226, an instant messaging store 1228, or a social networking site 1230. The multi-level list detection engine 100, the parser 110, the document processor 112, and the serializer 114 may use any of these types of systems or the like for enabling data utilization, as described herein. A server 1220 may provide the multi-level list detection engine 100, the parser 110, the document processor 112, and the serializer 114 to clients. As one example, the server 1220 may be a web server providing the multi-level list detection engine 100, the parser 110, the document processor 112, and the serializer 114 over the web. The server 1220 may provide the multi-level list detection engine 100, the parser 110, the document processor 112, and the serializer 114 over the web to clients through a network 1215. By way of example, the client computing device 1218 may be implemented as the computing device 1000 and embodied in a personal computer 1218*a*, a tablet computing device 1218*b* and/or a mobile computing device 1218*c* (e.g., a smart phone). Any of these embodiments of the client computing device 1218 may obtain content from the store 1216.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method of converting a fixed format document into a flow format document including one or more multi-level lists that dynamically update when edited by an end user, said method comprising:

identifying each text object in a collection of text objects that begins with a list identifier as a list element, said text objects derived from said fixed format document;

creating a new list when said list element and a previous list element in said list do not have selected properties that are substantially similar;

adding said list element to an existing list when said list element and said previous list element in said list have said selected properties that are substantially similar;

assigning said list element to a list level based on said selected properties;

determining a list level format for each said list level based on common properties of list elements belonging to said list level;

determining a list format from each said list level format; and merging list levels with common numbering schemes, including merging a lower list level having a first numbering scheme with a higher list level having a second numbering scheme when said first numbering scheme and said second numbering scheme use the same list format and said first numbering scheme and said second numbering scheme begin with a same list identifier.

2. The method of claim 1 characterized in that assigning said list element to a list level based on said selected properties further comprises assigning said list element to a new list level when said list element does not continue a numbering sequence of the last list element in said list.

3. The method of claim 1 characterized in that assigning said list element to a list level based on said selected properties further comprises assigning said list element to the same list level as the last list element in said list when said list identifier of said list element follows said last list element list identifier in sequence.

4. The method of claim 1 characterized in that assigning said list element to a list level based on said selected properties further comprises assigning said list element to the highest list level in said list when said list identifier of said list element continues the numbering sequence of said first list level.

5. The method of claim 1 characterized in that assigning said list element to a list level based on said properties further comprises assigning said list element to a list level other than a highest list level when said list element has a list identifier comprising a multi-number.

6. The method of claim 1 wherein said first numbering scheme and said second numbering scheme begin with same number for said list identifier.

7. The method of claim 1 further comprises merging a lower said list level with a higher said list when said lower list level continues the numbering sequence of said higher list level.

8. The method of claim 1 further comprising discarding each said list containing a single list element.

9. The method of claim 1 further comprising moving at least one selected said list level into a separate list.

10. A system for generating a flow format document including a multi-level list object from a fixed format document, said system comprising:
- a processing unit; and
- a memory including computer executable instructions which, when executed by a computer, provide a multi-level list detection engine application operable to:
  - identify a first text object as a first list element when the first text object begins with a first list identifier;
  - create a first list beginning with a first list element;
  - add said first list element to a first list level having a first numbering sequence;
  - identify a second text object as a second list element when the second text object begins with a second list identifier;
  - determine whether said second list identifier continues said first numbering sequence;
  - add said second list element to said first list level when said second list identifier continues said first numbering sequence;
  - compare a first value corresponding to an indentation of one or more list elements in said first list level to a second value corresponding to an indentation of said second list element to obtain a first indentation comparison result;
  - add said second list element to a second list level having a second numbering sequence when said second list identifier does not continue said first numbering sequence, and said first indentation comparison result indicates that said indentation of said second list element is greater than said indentation of at least one list element in said first list level; and
  - merging list levels with common numbering schemes, including merging a lower list level having a first numbering scheme with a higher list level having a second numbering scheme when said first numbering scheme and said second numbering scheme use the same list format and said first numbering scheme and said second numbering scheme begin with a same list identifier.

11. The system of claim 10 characterized in that said multi-level list detection engine application is further operable to:
- determine a list level format for each said list level based on selected properties of each list element in said first list belonging to the same list level; and
- define a list format based on each said list level format.

12. The system of claim 10 characterized in that said multi-level list detection engine application is further operable to create a second list beginning with said second list element when said second indentation is less than said first indentation and said second list identifier does not continue said first numbering sequence.

13. The system of claim 10 characterized in that said multi-level list detection engine application is further operable to:
- identify a third text object as a third list element when the third text object begins with a third list identifier;
- determine whether said third list identifier continues said second numbering sequence;
- add said third list element to said second list level when said third list identifier continues second first numbering sequence;
- compare a third value corresponding to an indentation of said third list element to said first value to obtain a second indentation comparison result; and
- add said third list element to a third list level when said third list identifier does not continue said second numbering sequence and said second indentation comparison result indicates that said indentation of said third list element is greater than said indentation of at least one list element in said first list level.

14. The system of claim 13 characterized in that said multi-level list detection engine application is further operable to create a second list beginning with said third list element when said third list element does not continue said first numbering sequence or said second numbering sequence and said second indentation comparison result indicates that said indentation of said third list element is less than or substantially equal to said indentation of at least one list element in said first list level.

15. The system of claim 10 characterized in that said multi-level list detection engine application is further operable to merge said third list level with said first list level when said list elements in said third list level continue said first numbering sequence.

16. A computer readable storage medium containing computer executable instructions which, when executed by a computer, perform a method of generating a flow format document including a multi-level list object from a fixed format document, said method comprising:
- identifying a list element appearing in the text obtained from the fixed format document;
- making a first comparison between at least one property associated with said list element and at least one list element appearing in a first list;
- placing said list element in said first list when said first comparison has a first result;
- making a second comparison between at least one property associated with said list element and a second list element appearing in a first list after said first list element;
- assigning said second list element to a list level based on said second comparison;
- making a third comparison between at least one property of said list element and other list elements in said first list at a selected list level;
- adjusting said list level of said list element based on said third comparison; and
- merging list levels with common numbering schemes, including merging a lower list level having a first numbering scheme with a higher list level having a second numbering scheme when said first numbering scheme and said second numbering scheme use the same list format and said first numbering scheme and said second numbering scheme begin with a same list identifier.

17. The computer readable medium of claim 16 characterized in that said list element appears after a first list element and a second list element in the text obtained from the fixed format document.

18. The computer readable medium of claim 16 characterized in that said method further comprises determining a list level format for each said list level based on selected properties of each list element belonging to the same list level.

19. The computer readable medium of claim 18 characterized in that said method further comprises defining a list format based on each list level format.

20. The computer readable medium of claim 16 characterized in that adjusting said list level of said list element based on said third comparison includes merging said list level containing said list element with said selected list level when said third comparison indicates that said list element belongs to said selected list level.

* * * * *